United States Patent
Chang et al.

(10) Patent No.: US 9,886,510 B2
(45) Date of Patent: *Feb. 6, 2018

(54) AUGMENTING SEARCH RESULTS WITH INTERACTIVE SEARCH MATRIX

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,662

(22) Filed: Dec. 28, 2015

(65) Prior Publication Data

US 2016/0110457 A1   Apr. 21, 2016

Related U.S. Application Data (63) Continuation of application No. 13/931,171, filed on Jun. 28, 2013, now Pat. No. 9,256,687.

(51) Int. Cl.
*G06F 17/30* (2006.01)

(52) U.S. Cl.
CPC .... *G06F 17/30864* (2013.01); *G06F 17/3064* (2013.01); *G06F 17/3097* (2013.01); *G06F 17/30392* (2013.01); *G06F 17/30507* (2013.01); *G06F 17/30867* (2013.01)

(58) Field of Classification Search
CPC ......... G06F 17/30864; G06F 17/30392; G06F 17/30507; G06F 17/3097; G06F 17/3064; G06F 17/30867

USPC ........................................................ 707/708
See application file for complete search history.

(56) References Cited

U.S. PATENT DOCUMENTS

| | | | |
|---|---|---|---|
| 5,544,354 A | | 8/1996 | May et al. |
| 5,920,855 A | * | 7/1999 | Aggarwal ......... G06F 17/30539 |
| 5,983,222 A | * | 11/1999 | Morimoto ......... G06F 17/30539 |
| 6,137,911 A | | 10/2000 | Zhilyaev |
| 6,411,950 B1 | * | 6/2002 | Moricz ............. G06F 17/30398 |

(Continued)

FOREIGN PATENT DOCUMENTS

JP         2002049635 A     2/2002

OTHER PUBLICATIONS

Fonseca et al., "Using Association Rules to Discover Search Engines Related Queries", In Proceedings of the First Latin American Web Congress (LA-WEB 2003), IEEE, 2003, 6 pages.*

(Continued)

*Primary Examiner* — Phuong Thao Cao
(74) *Attorney, Agent, or Firm* — William H. Hartwell (57) ABSTRACT

A computer performs a search. The computer receives a search request including a search term, and determines a plurality of association rules that are each a logical implication that the appearance of the search term follows from the appearance, in a corpus of data, of at least one keyword. The computer generates a search matrix having a plurality of cells, and having axes labeled with a plurality of keywords, wherein at least one cell of the search matrix is associated with an association rule of the plurality of association rules. Based on a cell selection of the search matrix, the computer generates an augmented search string including the search term and at least one keyword of the plurality of association rules.

17 Claims, 4 Drawing Sheets

(56) References Cited

U.S. PATENT DOCUMENTS

| | | | |
|---|---|---|---|
| 6,651,049 B1* | 11/2003 | Agrawal | G06F 17/30539 706/1 |
| 6,772,150 B1 | 8/2004 | Whitman et al. | |
| 6,925,453 B1* | 8/2005 | Bergman | G06N 5/022 706/20 |
| 7,181,459 B2 | 2/2007 | Grant et al. | |
| 7,370,033 B1 | 5/2008 | Roychowdhury | |
| 7,412,442 B1 | 8/2008 | Vadon et al. | |
| 7,634,475 B1 | 12/2009 | Hernek | |
| 7,752,243 B2* | 7/2010 | Hoeber | G06F 17/3064 707/706 |
| 7,769,746 B2* | 8/2010 | Lu | G06F 17/3064 707/708 |
| 7,774,333 B2* | 8/2010 | Colledge | G06F 17/30867 707/708 |
| 7,788,251 B2 | 8/2010 | Carlson et al. | |
| 7,870,152 B2 | 1/2011 | Cragun et al. | |
| 7,953,593 B2* | 5/2011 | Marchisio | G06F 17/30672 704/9 |
| 8,001,136 B1* | 8/2011 | Papachristou | G06F 17/30731 707/708 |
| 8,200,649 B2* | 6/2012 | Bennett | G06F 17/30265 707/705 |
| 8,255,383 B2* | 8/2012 | Jones | G06F 17/3064 707/708 |
| 8,255,403 B2* | 8/2012 | Kenedy | G06F 17/30867 705/26.7 |
| 8,332,383 B2* | 12/2012 | Posner | G06F 17/3064 707/708 |
| 8,332,393 B2 | 12/2012 | Elyada | |
| 8,346,791 B1 | 1/2013 | Shukla et al. | |
| 8,375,048 B1* | 2/2013 | Wad | G06F 17/30672 707/708 |
| 8,396,864 B1* | 3/2013 | Harinarayan | G06F 17/30707 707/722 |
| 8,601,019 B1 | 12/2013 | Weininger et al. | |
| 8,631,007 B1 | 1/2014 | Blandford et al. | |
| 8,676,798 B1* | 3/2014 | Datta | G06F 17/30864 707/706 |
| 8,880,495 B2 | 11/2014 | Andri et al. | |
| 8,909,616 B2* | 12/2014 | Rosenoff | G06F 17/30864 707/708 |
| 9,031,870 B2* | 5/2015 | Kenedy | G06F 17/30867 705/26.7 |
| 9,098,571 B2* | 8/2015 | Achuthan | G06F 17/30392 |
| 9,256,687 B2* | 2/2016 | Chang | G06F 17/30867 |
| 9,507,861 B2* | 11/2016 | Ali | G06F 17/30864 |
| 9,659,104 B2* | 5/2017 | Soon-Shiong | G06F 17/3089 |
| 2004/0002851 A1 | 1/2004 | Simske | |
| 2004/0015481 A1 | 1/2004 | Zinda | |
| 2004/0019588 A1 | 1/2004 | Doganata et al. | |
| 2006/0106767 A1 | 5/2006 | Adcock et al. | |
| 2006/0253427 A1 | 11/2006 | Wu et al. | |
| 2006/0282222 A1* | 12/2006 | Mitsuyama | G06F 19/345 702/19 |
| 2007/0006129 A1 | 1/2007 | Cieslak et al. | |
| 2007/0016571 A1 | 1/2007 | Assadian et al. | |
| 2007/0118506 A1 | 5/2007 | Kao et al. | |
| 2007/0136225 A1 | 6/2007 | Church et al. | |
| 2007/0214126 A1 | 9/2007 | Kikinis | |
| 2007/0244747 A1* | 10/2007 | Nikovski | G06Q 30/02 705/14.53 |
| 2008/0022216 A1 | 1/2008 | Duval | |
| 2008/0077570 A1* | 3/2008 | Tang | G06F 17/30684 |
| 2009/0119281 A1 | 5/2009 | Wang et al. | |
| 2009/0192954 A1* | 7/2009 | Katukuri | G06F 17/3061 706/11 |
| 2010/0005051 A1* | 1/2010 | Agrawal | G06N 5/022 706/55 |
| 2010/0010968 A1 | 1/2010 | Redlich et al. | |
| 2010/0076984 A1 | 3/2010 | Papadopoullos et al. | |
| 2010/0114929 A1* | 5/2010 | Bonchi | G06F 17/3064 707/759 |
| 2010/0161580 A1 | 6/2010 | Chipman et al. | |
| 2010/0205202 A1 | 8/2010 | Yang et al. | |
| 2010/0306123 A1* | 12/2010 | Cai | G06Q 30/0282 705/347 |
| 2011/0035403 A1 | 2/2011 | Ismalon | |
| 2012/0041959 A1 | 2/2012 | Weissman et al. | |
| 2012/0209625 A1 | 8/2012 | Armstrong et al. | |
| 2013/0078606 A1 | 3/2013 | White et al. | |
| 2013/0132357 A1 | 5/2013 | Edgar et al. | |
| 2013/0211785 A1* | 8/2013 | Bonissone | G05B 23/02 702/184 |
| 2013/0268551 A1 | 10/2013 | Nikankin | |
| 2014/0067846 A1 | 3/2014 | Edwards et al. | |
| 2014/0149185 A1* | 5/2014 | Mukherjee | G06Q 10/101 705/7.36 |
| 2014/0172439 A1* | 6/2014 | Conway | G06F 19/328 705/2 |
| 2014/0258330 A1* | 9/2014 | Cheng | G06F 17/30979 707/771 |
| 2014/0278359 A1 | 9/2014 | Speer et al. | |
| 2015/0032746 A1* | 1/2015 | Lev-Tov | G06F 17/30539 707/737 |
| 2016/0004711 A1* | 1/2016 | Soon-Shiong | G06Q 30/02 715/205 |

OTHER PUBLICATIONS

Sekhavat et al., "Visualizing Association Rules Using Linked Matrix, Graph, and Detail Views", International Journal of Intelligence Science, 2013, 3, pp. 34-49, Published online Mar. 2013.*

Song et al., "Integration of Association Rules and Ontologies for Semantic Query Expansion", Data & Knowledge Engineering 63 (2007), pp. 63-75, Available online Nov. 27, 2006.*

Wei et al., "Mining Term Association Rules for Automatic Global Query Expansion: Methodology and Preliminary Results", In Proceedings of the First International Conference on Web Information Systems Engineering (WISE ' 00), IEEE, pp. 366-373, Jun. 19-20, 2000.*

Feldman et al., "Maximal Association Rules: a New Tool for Mining for Keyword Co-occurrences in Document Collections", In Proceedings of the Third International Conference on Knowledge Discovery and Data Mining (KDDM- 97), pp. 167-170, AAAI Press, 1997.*

Liu et al., "Query Expansion Terms based on Positive and Negative Association Rules", In Proceedings of the Third International Conference on Information Science and Technology (ICIST 2013), pp. 802-808, Mar. 2013.*

An, Jiyuan et al., "Keyword Extraction for Text Categorization", Copyright 2005, IEEE, Australia, 1 page.

Graus, David, "Simple Keyword Extraction in Python: Choices, Choices", Blog, retrieved on Mar. 25, 2013 from web address: http://graus.nu/blog/simple-keyword-extraction-in-python/, 4 pages.

Hathaway, J. "Google Squared launches, puts search results in a grid", Jun. 3, 2009, Source: WaybackMachine <http://web.archive.org/web/20120330034337/http://downloadsquad.switched.com/2009/06/03/google-squared-launches-puts-search-results-in-a-grid>, 4 pages.

Hynes, Aldon, "Using Graphviz, Drupal and Google Analytics to Display Keyword Relationships", Orient Lodge, retrieved on Mar. 25, 2013 from web address: http://www.orient-lodge.com/node/4044, 3 pages.

Kaur, Jasmeen et al., "Effective Approaches for Extraction of Keywords", IJCSI International Journal of Computer Science Issues, vol. 7, Issue 6, Nov. 2010, ISSN (Online): 1694-0814, Website: www.IJSCI.org, pp 144-148.

Mahgoub, H. "A Text Mining Technique Using Association Rules Extraction". World Academy of Science, Engineering and Technology, International Journal of Computer, Electrical, Automation, Control and Information Engineering vol. 2, No. 6, 2008. International Scholarly and Scientific Research & Innovation 2(6) 2008. scholar waset.org/1999.4/3124. pp. 2044-2051.

(56) References Cited

OTHER PUBLICATIONS

"Keywords Extraction", Text Analysis Mining Knowledge from Text Data, retrieved on Mar. 25, 2013 from web address: http://text-analysis.sourceforge.net/keywords-extration, 1 page.

"Association rule learning-Wikipedia, the free encyclopedia". Mar. 13, 2013. <https://en/wikipediaorg/w/index.php?title=Association_rule_learning&oldid=543776152>. pp. 1-9.

Aljandal et al., "Ontology-Aware Classification and Association Rule Mining for Interest and Link Prediction in Social Networks", AAAI 2009 Spring Symposium on Social Semantic Web: Where Web. vol. 2, 2009, 6 pages.

Yuan et al., "A Matrix Algorithm for Mining Association Rules", ICIC2005, Part I, LNCS 3644, pp. 370-379, 2005.

Liu et al., "Using Stem Rules to Refine Document Retrieval Queries", In Proceedings of the First Latin American Web Congress (LA-WEB 2003), 12 pages, 2003.

\* cited by examiner

AUGMENTING SEARCH RESULTS WITH INTERACTIVE SEARCH MATRIX

FIELD OF THE INVENTION

The present invention relates generally to internet search engines, and more particularly to search engine indexing utilizing term and keyword detection, subject matter ontologies, and association rule determination.

BACKGROUND

The use of the Internet has become pervasive, and business entities and individuals use the Internet as a tool for obtaining information regularly. For example, such Internet users use search engines to search numerous World Wide Web sites and/or databases for information relevant to search terms. In recent years, the sophistication of search engines has improved, increasing the ability of search engines to produce search results that accurately reflect the search terms provided by the users. However, in circumstances where users are interested in understanding a broad field, such accuracy can actually be counterproductive. Further, search engines typically present users with a large volume of relevant information, and the users must consider a large portion of the relevant information to comprehensively understand the context of the search results.

SUMMARY

Embodiments of the present invention provide for a program product, system, and method in which a computer performs a search. The computer receives a search request including a search term, and determines a plurality of association rules that are each a logical implication that the appearance of the search term follows from the appearance, in a corpus of data, of at least one keyword. The computer generates a search matrix having a plurality of cells, and having axes labeled with a plurality of keywords, wherein at least one cell of the search matrix is associated with an association rule of the plurality of association rules. Based on a cell selection of the search matrix, the computer generates an augmented search string including the search term and at least one keyword of the plurality of association rules.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) Java may be subject to trademark and/or service mark rights in various jurisdictions throughout the world, and, to that extent, references to this term(s) herein are to be taken to exclusively apply only to legitimate products of the trademark/service mark owner(s)), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
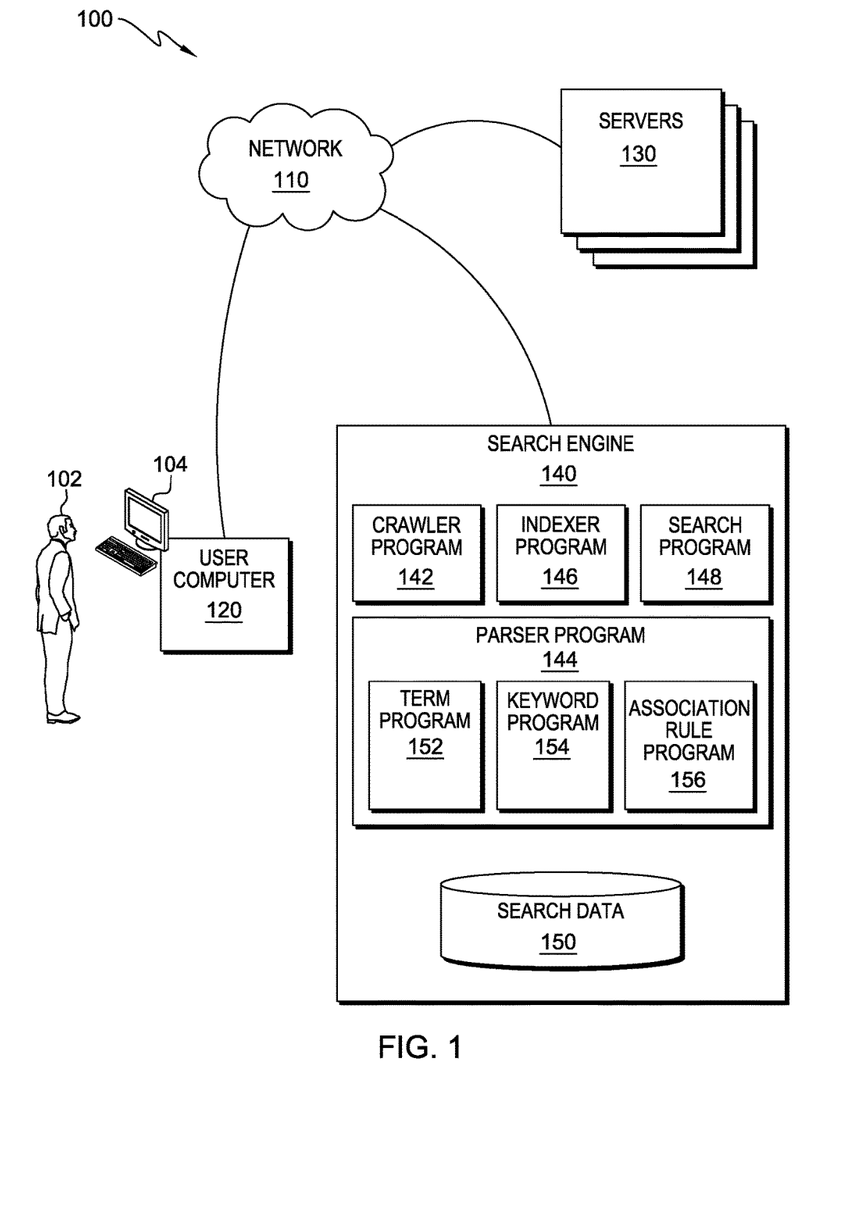
FIG. 1 is a block diagram of a search environment in accordance with an embodiment of the present invention.

Referring now to FIG. 1, a block diagram of search environment 100 in accordance with an embodiment of the present invention is shown. Search environment 100 includes network 110, user computer 120, servers 130, and search engine 140. Network 110 can be, for example, a local area network (LAN), a wide area network (WAN) such as the Internet, or a combination of the two, and can include wired or wireless connections. In general, network 110 can be any combination of connections and protocols that will support communications between user computer 120, servers 130, and search engine 140 in accordance with an embodiment of the invention. As will be discussed in detail below, person 102, a user of search environment 100, can utilize user computer 120 to search for a search term using search engine 140, and to interact with a resulting search matrix, generated by search engine 140, on user interface 104 of user computer 120.

In various embodiments, user computer 120, each one of servers 130, as well as search engine 140, can include a laptop, tablet, or netbook personal computer, a desktop computer, a personal digital assistant, a smart phone, a mainframe computer, or a networked server computer. Further, user computer 120, each one of servers 130, as well as search engine 140, can include computing systems utilizing clustered computers and components to act as single pools of seamless resources when accessed through network 110, or can represent one or more cloud computing datacenters. In general, user computer 120, each one of servers 130, as well as search engine 140, can be any programmable electronic device as described in further detail below with respect to FIG. 4.

User computer 120 includes software, such as a web browser program, for interacting with search engine 140, and optionally with one or more of servers 130, via network 110. For example, one or more of servers 130 can host web pages viewable on the web browser program of user computer 120. For another example, the web browser program of user computer 120 can load a search interface web page from search program 148 of search engine 140, in order to make a search request. In particular, person 102 can enter a search term into the loaded search interface web page displayed by the web browser program, and the web browser program can make a search request by transmitting the search term back to search program 148. Subsequently, search program 148 can generate a search matrix (e.g., search matrix 260 depicted in FIG. 2A, etc.) and transmit the search matrix to user computer 120 as discussed in detail below. Additionally, person 102 can interact with the search matrix to select one or more cells for augmented searching, as further discussed in detail below.

Search engine 140 includes crawler program 142, parser program 144, indexer program 146, search program 148, and search data 150. Search program 148 provides an interface between search engine 140 and clients of search engine 140 (e.g., one or both of person 102 and user computer 120 can be regarded as clients of search engine 140, etc.). For example, search program 148 can provide an interface by transmitting a search interface web page to a web browser program of user computer 120, and then by interacting with person 102 via the search interface web page. Search program 148 also generates a search matrix, and assists person 102 in interacting with the search matrix to select one or more cells for augmented searching, by utilizing a subject-matter ontology stored in search data 150, as well as by utilizing data that has been stored in search data 150 by crawler program 142, parser program 144, and indexer program 146.

Crawler program 142, parser program 144, and indexer program 146 operate together to crawl, parse, and index web pages hosted on servers 130, to facilitate the handling of search requests by search program 148. The operation of crawler program 142, parser program 144, and indexer program 146 can occur continuously, as background processes, such that search requests received by search program 148 are handled using up-to-date information from ongoing crawl, parse, and index operations. Up-to-date information from the operation of crawler program 142, parser program 144, and indexer program 146 is stored in search data 150 and accessible by search program 148.

During operation, crawler program 142 locates web pages hosted on servers 130, fetches the web pages to search engine 140, and provides the web pages to parser program 144 and indexer program 146 for parsing and indexing, respectively. Crawler program 142 can crawl web pages linked together with URLs by, for example, starting with a list of seed URLs, crawling the seed URLs, and adding any found URLs to the list for further crawling. In various embodiments, crawler program 142 is not limited to crawling web pages hosted on servers 130, but can also crawl any kind of documents, data stores, or repositories hosted on servers 130 and available for crawling by search engine 140.

As crawler program 142 crawls web pages hosted on servers 130, crawler program 142 provides the web pages to parser program 144. Parser program 144 includes the subprograms term program 152, keyword program 154, and association rule program 156. During operation, term program 152 performs search term parsing of each web page, so that indexer program 146 can then construct a term index stored in search data 150. In particular, term program 152 can tokenize the contents of each web page provided by crawler program 142, and provide the tokenized contents to indexer program 146 for the construction of a reverse term index. A reverse term index lists each web page that a given term appears in, to facilitate basic handling of search requests, as known in the art. For example, using the term index in search data 150, search program 148 can handle a search request by looking up the search term of the search request in the term index to find out which web pages the search term appears in, and by returning these web pages to user computer 120 as a basic search result. As will be discussed in detail below, the operation of keyword program 154 and association rule program 156 significantly augment such basic search request handling.

During operation, keyword program 154 performs keyword parsing of each web page that parser program 144 receives from crawler program 142, so that indexer program 146 can then construct a keyword index stored in search data 150. In particular, keyword program 154 can tokenize the contents of each web page provided by crawler program 142, identify keywords, and provide the tokenized keywords to indexer program 146 for the construction of a reverse keyword index, listing each web page that a given keyword appears in. In one embodiment, keyword program 154 operates on each web page in isolation, while in another embodiment keyword program 154 operates on a large corpus of multiple web pages during, e.g., a global analysis phase. Keyword program 154 identifies keyword tokens by, for example, utilizing keyword extraction techniques such as those described in or referenced in Kaur et al., "Effective Approaches for Extraction of Keywords," *IJCSI International Journal of Computer Science Issues*, Vol. 7, Issue 6, November 2010; ISSN (online): 1694-0814; pp. 144-148, which is herein incorporated by reference in its entirety. Notably, the contents of the resulting keyword index may be a subset of the contents of the term index described above, because keyword program 154 is more selective in making an identification than term program 152. Stated another way, a keyword is likely to also be a term, but a term is not as likely to also be a keyword, although exceptions to this rule may be found in certain embodiments.

During operation, association rule program 156 extracts association rules from each web page that parser program 144 receives from crawler program 142, and stores the association rules in a rule index stored in search data 150. In one embodiment, association rule program 156 also determines and stores the strength of each extracted association rule. Association rule program 156 typically operates on a large corpus of multiple web pages during, e.g., a global analysis phase. Each extracted association rule takes the form of a logical implication that the appearance of a keyword follows from the appearance of at least two other related keywords, i.e., takes the form {keyword 1, keyword 2} ⇒ {keyword 3}. Association rule program 156 extracts association rules and determines association rule strength by, for example, utilizing association rule extraction techniques such as those described in or referenced in Mahgoub et al., "A Text Mining Technique Using Association Rules Extraction," *International Journal of Information and Mathematical Sciences*, 4:1 2008, pp. 21-28, which is herein incorporated by reference in its entirety. In one embodiment, association rule strength is determined by the support, confidence, or conviction of an association rule. Thus, association rule program 156 extracts association rules amongst the keywords identified by keyword program 154, and stores the extracted association rules and their strengths in a rule index cross referenced against the keyword index of search data 150.

As discussed above, during operation, crawler program 142 locates web pages hosted on servers 130, fetches the web pages to search engine 140, and provides the web pages to parser program 144 and indexer program 146 for parsing and indexing, respectively. During such operation, term program 152, keyword program 154, and association rule program 156 populate a term index, keyword index, and rule index stored in search data 150. As stated above, such operation can occur continuously, as background processes, such that search requests received by search program 148 are handled using up-to-date information from ongoing crawl, parse, and index operations, as well as by using a subject-matter ontology stored in search data 150. Below, the handling of a search request received by search program 148 will be discussed.

During operation, search program 148 receives search requests from, e.g., user computer 120. For each search request, search program 148 generates a search matrix, and assists with user interaction with the search matrix to select one or more cells for augmented searching, by utilizing the term index, keyword index, rule index, and subject-matter ontology stored in search data 150. In particular, upon receiving a search request, search program 148 looks up the search term of the search request in the subject matter ontology, to identify ontologically-related terms. A search term can be a word, a phrase, or a string including conjunctively and disjunctively joined words or phrases, for example.

For example, if the search term is "mobile phone," then the subject-matter ontology can identify "location-based services," "camera," "touch screen," and additional ontologically-related terms. Additional ontologically-related terms of this example are discussed in the context of FIG. 2A, below. Notably, the subject-matter ontology can actually include multiple, potentially-overlapping ontologies for different subject-matter areas. For example, "mobile phone" might share ontologically-related terms with "tablet computing." In various embodiments, the multiple ontologies can have varying scope. For example, in one embodiment, search data 150 includes a subject-matter ontology limited to a technology scope, such that it includes ontologies for electrical devices and digital computers but not, say, medical conditions. In other embodiments, search data 150 includes subject-matter ontologies dedicated strictly to legal concepts, to automobile data, or to medical data. Still further, in another embodiment search data 150 includes subject-matter ontologies of broad, encyclopedic scope, so that search program 148 can generate a search matrix, and assist with user interaction with the search matrix to select one or more cells for augmented searching, in any conceivable subject-matter area.

Having looked up the search term of the search request in the subject matter ontology to identify ontologically-related terms, search program 148 generates a search matrix by utilizing the ontologically-related terms to label axes of the search matrix. An exemplary search matrix, search matrix 260, is shown in FIG. 2A to which discussion now turns.

Figure 2A:
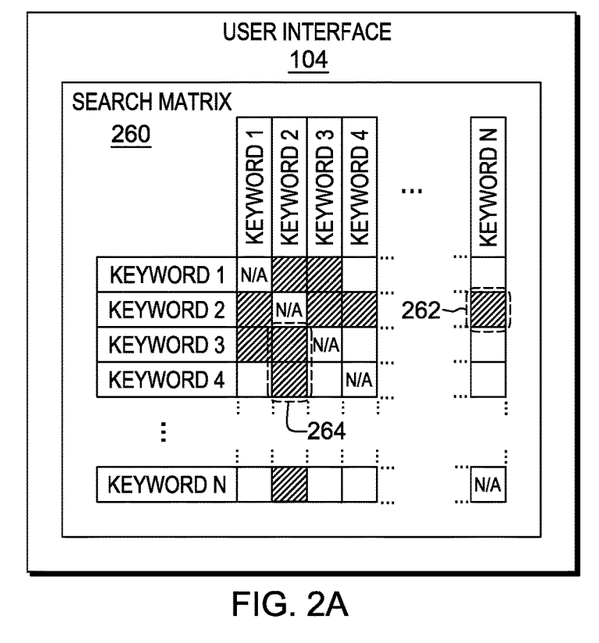
FIGS. 2A and 2B are illustrations of a user interface depicting a search matrix in accordance with an embodiment of the present invention.

Referring now to FIG. 2A, an illustration of user interface 104 depicting search matrix 260 in accordance with an embodiment of the present invention is shown. Search matrix 260 is a two-axis matrix, and each axis is labeled with keywords 1 through n, each ontologically-related to a search term of a search request received by search program 148. Only keywords 1 through 4, and n, are shown for clarity. In one embodiment, keywords 1 through 3 are "location-based services," "camera," and "touch screen" in accordance with an example described above. It should be understood that n, an integer, can be any number of ontologically-related terms found by search program 148 during a look-up of the search term in the subject matter ontology. Within search matrix 260 are a number (e.g., $n^2$) of row-column cells. Search program 148 shades, leaves unshaded, or fills with the text "n/a" each row-column cell, as discussed below. FIG. 2A further depicts user selections 262 and 264, also discussed below.

Search program 148 generates search matrix 260 by labeling the axes with keywords 1 through n, by filling in the same-keyword row-column cells on the diagonal of search matrix 260 with "n/a," and by filling in (e.g., shading, etc.) each dissimilar-keyword row-column cell according to whether or not the keywords intersecting at the cell imply the search term of the search request, according to an association rule stored in the rules index of search data 150. For example, search program 148 fills in the cell of keyword 1 and keyword 1 with "n/a," as well as the cell of keyword 2 and keyword 2, etc., proceeding through the cell of keyword n and keyword n. Further, search program 148 shades the cell of keyword 1 and keyword 2, shades the cell of keyword 1 and keyword 3, and leaves unshaded the cell of keyword 1 and keyword 4. In one embodiment, the intensity of the shading is governed by the strength of the relevant association rule. For example, the cell of keyword 1 and keyword 2 can be shaded lightly if those keywords imply the search term weakly, while the cell of keyword 1 and keyword 3 can be shaded darkly if those keywords imply the search term of the search request strongly. In another embodiment, cells will be shaded at all only if their intersecting keywords imply the search term with a strength exceeding a user threshold.

Notably, the shading of cells in search matrix 260 is the same regardless of whether cells are named by row-column intersection or by column-row intersection; i.e., search matrix 260 is reflected identically across the "n/a" diagonal. This is the case because, according to the operation of a given association rule, the statement {keyword 1, keyword 2} ⇒ {search term} is equivalent to the statement {keyword 2, keyword 1} ⇒ {search term}.

Having received a search request including a search term, and having then generated search matrix 260 based on the search term, search program 148 transmits search matrix 260 to user computer 120, where it is displayed to person 102 on user interface 104. It should be understood that in one embodiment, the visual depiction of search matrix 260 depicted in FIG. 2A is generated client-side, at user computer 120, such that search program 148 does not actually generate a graphical depiction, and instead generates and transmits only a data structure sufficient for user computer 120 to generate the visual depiction of search matrix 260. Person 102 can then interact with search matrix 260 to select one or more cells for augmented searching.

Person 102 can select one or more cells for augmented searching by, for example, selecting one or more cells with a mouse or other pointing device. The selection is transmitted from user computer 102 to search program 148. Upon receiving a selection of a single cell, for example user selection 262, search program 148 generates an augmented search string including the search term in the original search request, as well as the keywords intersecting at the selected cell. For example, user selection 262 selects the cell at the intersection of keyword 2 and keyword n, and as such search program 148 generates an augmented search string "search term AND (keyword 2 AND keyword n)." Notably, the augmented search string includes the search term, conjunctively joined with both keywords, themselves also conjunctively joined.

Further, upon receiving a selection of multiple cells, for example user selection 264, search program 148 generates an augmented search string including the search term in the original search request, as well as the keywords intersecting at all of the selected cells. For example, user selection 264 selects the cells at the intersections of keyword 2, keyword 3, and keyword 4. As such, search program 148 generates an augmented search string "search term AND ((keyword 2 AND keyword 3) OR (keyword 2 AND keyword 4))." Notably, the augmented search string includes the search term conjunctively joined with disjunctively joined sets of conjunctively joined keywords. In particular, in the augmented search string, keyword 2 is conjunctively joined with each of keyword 3 and keyword 4, in two disjunctive sets. Another selection of multiple cells (not shown) can be made by, for example, selecting an axis label to automatically select all of the cells in the label's row or column (e.g., selecting the keyword 2 column label will have the effect of selecting both cells of user selection 264, as well as all of the additional cells in the same column).

Having generated an augmented search string including the search term in the original search request, as well as the keywords intersecting at the one or more selected cells, search program 148 performs a search using data in search data 150 to return an augmented search result to user computer 120. For example, search program 148 can perform a search by locating web pages that include that include the logical combination of search terms and keywords in the augmented search string in the term index of search data 150. Having located such relevant web pages, search program 148 returns them to user computer 120 as an augmented search result, which person 102 can view.

Figure 2B:
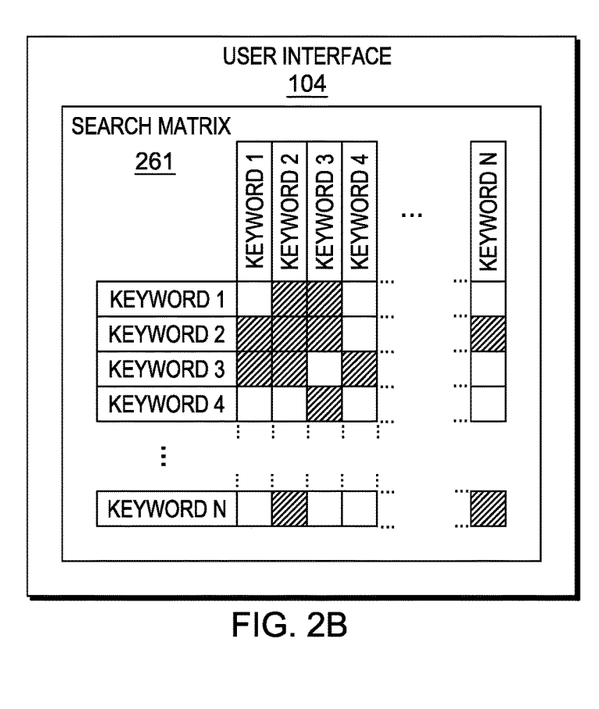

Referring now to FIG. 2B, an illustration of user interface 104 depicting search matrix 261 in accordance with an embodiment of the present invention is shown. Search matrix 261 is similar in most regards to search matrix 260, except that search program 148 has not filled in the same-keyword row-column cells on the diagonal of search matrix 260 with "n/a." Instead, search program 148 has filled in (e.g., with shading, etc.) every row-column cell according to whether or not the keywords intersecting at the cell imply the search term of the search request, according to an association rule stored in the rules index of search data 150. Notably, in this embodiment each extracted association rule can take the form of a logical implication that the appearance of a keyword follows from the appearance of at least one other related keyword, e.g., can take the form {keyword 2} ⇒ {search term}. As such, in the context of FIG. 2B, search program 148 can generate an augmented search string including the search term in the original search request, as well as the single keyword intersecting at a selected cell on the diagonal of search matrix 261.

Figure 3:
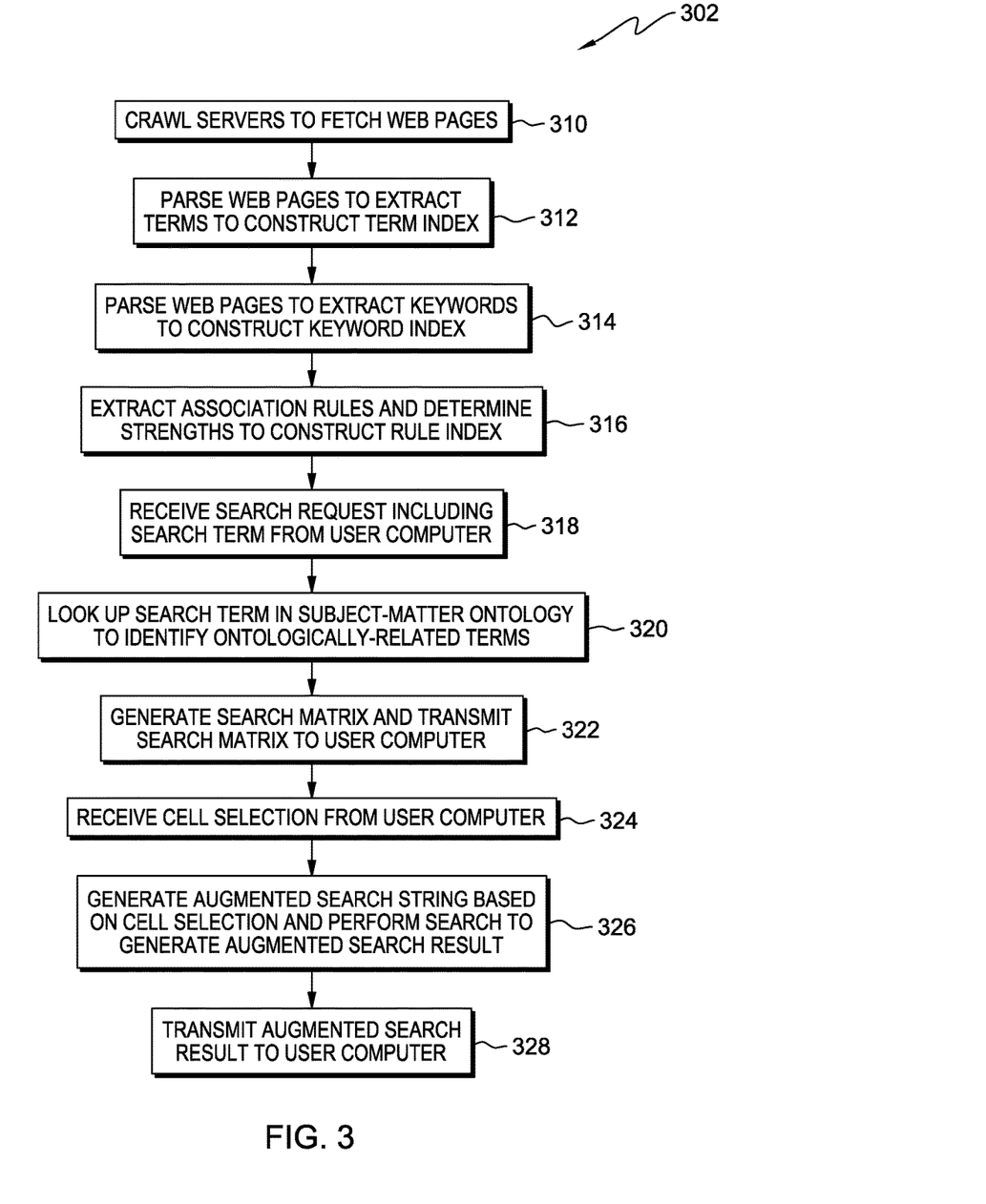
FIG. 3 is a flowchart depicting steps followed by a search engine in accordance with an embodiment of the present invention.

Referring now to FIG. 3, flowchart 302 depicts steps followed by search engine 140 in accordance with an embodiment of the present invention. In step 310, crawler program 142 crawls servers 130 to fetch web pages. In step 312, term program 152 of parser program 144 parses the web pages to extract terms to construct a term index in search data 150. In step 314, keyword program 154 of parser program 144 parses the web pages to extract keywords to construct a keyword index in search data 150. In step 316, association rule program 156 of parser program 144 extracts association rules and determine their strengths to construct a rule index in search data 150.

In step 318, search program 148 receives a search request including a search term from user computer 120. In step 320, search program 148 looks up the search term in a subject-matter ontology in search data 150 to identify ontologically-related terms of the search term. In step 322, search program 148 generates a search matrix, such as search matrix 260 or search matrix 261, and transmits the generated search matrix to user computer 120. In step 324, search program 148 receives a cell selection of one or more cells of the generated search matrix from user computer 120. In step 326, search program 148 generates an augmented search string based on the cell selection, and performs a search to generate an augmented search result. In step 328, search program 148 transmits the augmented search result to user computer 120.

Figure 4:
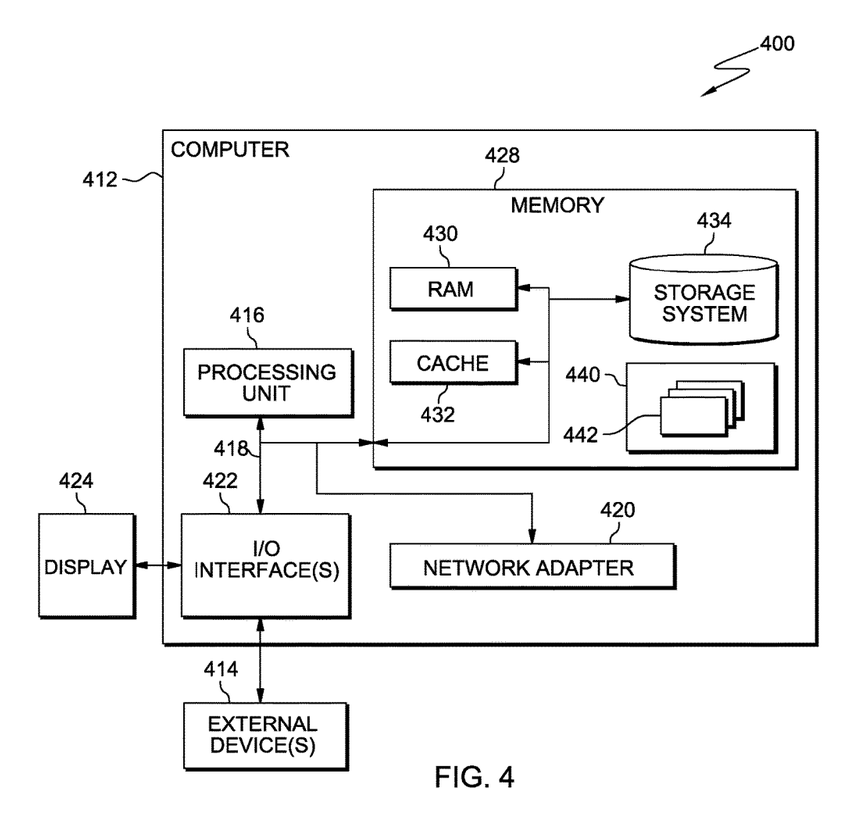
FIG. 4 is a block diagram of a computer system in accordance with an embodiment of the present invention.

Referring now to FIG. 4, a block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. User computer 120, each one of servers 130, as well as search engine 140, can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Crawler program 142, parser program 144, indexer program 146, search program 148, term program 152, keyword program 154, and association rule program 156 can be implemented as or can be an instance of program 440.

Computer 412 may also communicate with one or more external devices 414 such as a keyboard, a pointing device, or one or more devices that enable a user to interact with computer 412, such as via user interface 104 on display 424; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing a search, the method comprising:
   receiving, by at least one computing processor, a search request including a search term;
   determining, by the at least one computing processor, a plurality of association rules that are each a logical implication that an appearance of the search term follows from an appearance, in a corpus of data, of one or two keywords that are ontologically related to the search term;
   generating, by the at least one computing processor, a search matrix having a plurality of cells, and having axes labeled with a plurality of keywords that are ontologically related to the search term, wherein at least two cells of the search matrix are associated with respective association rules of the plurality of association rules;
   receiving, by the at least one computing processor, a cell selection that includes multiple cells of the search matrix;
   generating, by the at least one computing processor, an augmented search string including the search term and, for each cell included in the cell selection, at least one keyword of the association rule of the respectively corresponding cell; and
   performing, by the at least one computing processor, a search using the augmented search string.

2. The method of claim 1, wherein the cell selection is received from a source of the search request.

3. The method of claim 2, further comprising, prior to receiving the cell selection from the source of the search request, transmitting, by the at least one computing processor, the search matrix to the source of the search request.

4. The method of claim 3, wherein the source of the search request is a human user.

5. The method of claim 1, wherein determining the plurality of association rules includes looking up the search term in a subject-matter ontology to identify at least one keyword that is ontologically related to the search term.

6. The method of claim 1, wherein, in the augmented search string, the search term is conjunctively joined with the at least one keyword of the association rule for each respectively corresponding cell in the cell selection.

7. A computer program product for performing a search, the computer program product comprising:
   one or more computer-readable storage devices and program instructions stored on at least one of the one or more computer-readable storage devices, the program instructions comprising:
   program instructions to receive a search request including a search term;
   program instructions to determine a plurality of association rules that are each a logical implication that an appearance of the search term follows from an appearance, in a corpus of data, of one or two keywords that are ontologically related to the search term;
   program instructions to generate a search matrix having a plurality of cells, and having axes labeled with a plurality of keywords that are ontologically related to the search term, wherein at least two cells of the search matrix are associated with respective association rules of the plurality of association rules;
   program instructions to receive a cell selection that includes multiple cells of the search matrix;
   program instructions to generate an augmented search string including the search term and, for each cell included in the cell selection, at least one keyword of the association rule of the respectively corresponding cell; and
   program instructions to perform a search using the augmented search string.

8. The computer program product of claim 7, wherein the cell selection is received from a source of the search request.

9. The computer program product of claim 8, further comprising program instructions to, prior to receiving the cell selection from the source of the search request, transmit the search matrix to the source of the search request.

10. The computer program product of claim 9, wherein the source of the search request is a human user.

11. The computer program product of claim 7, wherein determining the plurality of association rules includes looking up the search term in a subject-matter ontology to identify at least one keyword that is ontologically related to the search term.

12. The computer program product of claim 7, wherein, in the augmented search string, the search term is conjunctively joined with the at least one keyword of the association rule for each respectively corresponding cell in the cell selection.

13. A system for performing a search, the system comprising:
   one or more processors, one or more memories, one or more computer-readable storage devices, and program instructions stored on at least one of the one or more computer-readable storage devices for execution by at least one of the one or more processors via at least one of the one or more memories, the program instructions comprising:
   program instructions to receive a search request including a search term;
   program instructions to determine a plurality of association rules that are each a logical implication that an appearance of the search term follows from an appearance, in a corpus of data, of one or two keywords that are ontologically related to the search term;
   program instructions to generate a search matrix having a plurality of cells, and having axes labeled with a plurality of keywords that are ontologically related to the search term, wherein at least two cells of the search matrix are associated with respective association rules of the plurality of association rules;
   program instructions to receive a cell selection that includes multiple cells of the search matrix;
   program instructions to generate an augmented search string including the search term and, for each cell included in the cell selection, at least one keyword of the association rule of the respectively corresponding cell; and
   program instructions to perform a search using the augmented search string.

14. The system of claim 13, wherein the cell selection is received from a source of the search request.

15. The system of claim 14, further comprising program instructions to, prior to receiving the cell selection from the source of the search request, transmit the search matrix to the source of the search request.

16. The system of claim 15, wherein the source of the search request is a human user.

17. The system of claim 13, wherein determining the plurality of association rules includes looking up the search term in a subject-matter ontology to identify at least one keyword that is ontologically related to the search term.

\* \* \* \* \*